Nov. 22, 1927.    1,650,129
D. S. JACOBUS
METHOD OF DEGASSING WATER
Filed June 13, 1919
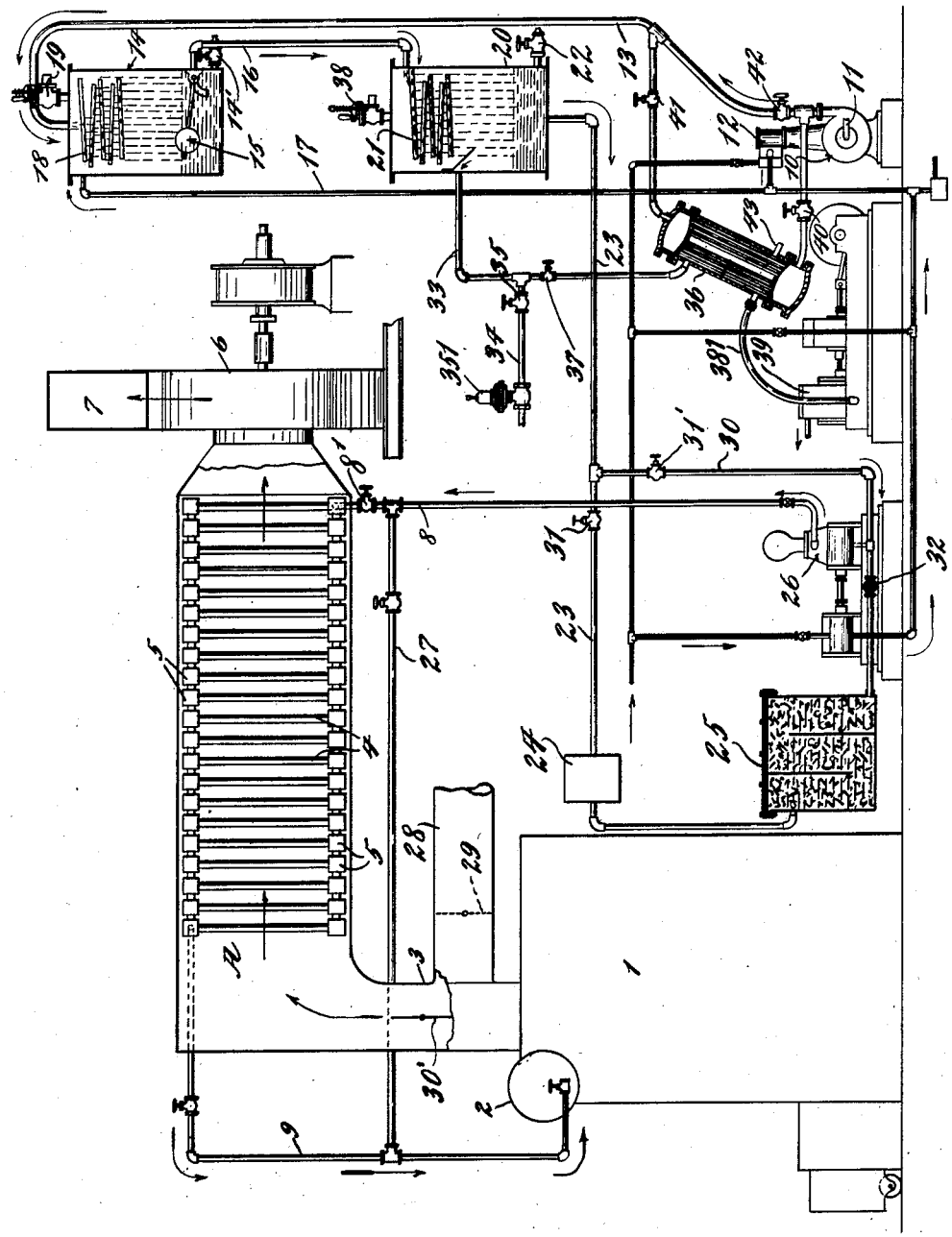
WITNESSES:
M. E. McNinch
E. M. Lockwood
INVENTOR
David S. Jacobus
BY Gifford & Bull
His ATTORNEYS Patented Nov. 22, 1927.

1,650,129

UNITED STATES PATENT OFFICE.

DAVID S. JACOBUS, OF JERSEY CITY, NEW JERSEY, ASSIGNOR TO THE BABCOCK & WILCOX COMPANY. OF BAYONNE, NEW JERSEY, A CORPORATION OF NEW JERSEY.

METHOD OF DEGASSING WATER.

Application filed June 13, 1919. Serial No. 303,983.

The presence of air or gases in boiler water is a well recognized source of corrosion, and for this reason it is desirable that the air or gases contained in water fed to an economizer, and thence into a boiler, be eliminated, or that the amount be reduced to a minimum. The majority of power plants are operated on what is, in the main, a closed cycle for that part of the steam which is returned from a condenser to the boiler in the form of feed water, so that this part of the feed water does not come in contact with the atmosphere except to a limited extent, which may give little opportunity for absorbing the air and gases. Where surface condensers are used, the only air and gases that would enter the system in the closed part of the cycle, aside from that which might be absorbed in the condensed steam from the condensers on its way to the economizer and boilers, would come through air and gases in any circulating water that might leak through at the condenser from the circulating water space into the steam space. Experience has shown that it is difficult to build an absolutely tight condenser, and in most instances there is a material amount of leakage of the circulating water from the circulating water space, and this results in air and gases being carried into the system. Again, there is always a certain amount of leakage of steam and water from the system and losses occasioned through the blowing down of the boilers, which makes it necessary to add make-up water from outside sources. This make-up water usually contains a relatively large amount of air and gases. These features combined cause the feed water which is normally fed to economizers and boilers to contain a component of air and gases, which leads to an excessive amount of corrosion where wrought steel or wrought iron economizers are used.

My invention has for its object the elimination or reduction of the air and gases contained in the feed water, such water comprising that from the condensers and the necessary amount of make-up water, and is especially adaptable to modern power plant practice, which favors the use of wrought steel or wrought iron economizers for the higher boiler pressures which are now carried. The degree of thoroughness with which the air or gases must be removed to obtain good results varies with different sets of conditions.

Generally stated, the invention consists in boiling the heated water by reducing the pressure in the vessel to an amount that will cause the heat contained in the water to boil the same, the boiling being continued until substantially all of the air and gases are removed. This reduced pressure may be obtained by connecting the vessel with the condenser of the main power plant or it may be effected by a separate dry vacuum pump. After boiling the water in an enclosed tank it is preferably fed through a tank containing an oxidizable material, such as steel or iron, which serves to further remove any oxygen or other corrosive elements remaining in the water, and thence through a closed system to an economizer and thence to a boiler. The actual boiling of the water to expel the air is an important step in the present process if the air or gases are to be reduced to a minimum, as will be seen when the following features are considered.

In accordance with my present invention, the water is boiled during a length of time sufficient to eliminate substantially all of the air and gases, or enough of the air and gases to leave but little oxygen to be removed by the tank containing the steel or iron, through which the feed water preferably passes after it is boiled to remove the greater part of the air and gases.

A time element enters the problem of eliminating the air through subjecting to a reduced pressure, and in certain cases it is advantageous to so design the apparatus, that more residual air and oxygen will remain in the feed water after the reduced pressure treatment than in other cases. This makes it advantageous to pass the feed water through the tank containing steel or iron after it is subjected to a reduced pressure to remove the greater part of the air. Again, where the tank containing steel or iron is employed, it is advantageous to first expel the greater part of the air and gases by subjecting the water to a reduced pressure, as otherwise the bulk and weight of the tank containing the steel or iron must be much greater than it is where the greater part of the air and gases are so expelled. Again, a much greater quantity of steel or iron would have to be used in the tank for removing the air if there were no preliminary treatment of the water, thereby making the process more expensive and cumbersome in replacing the steel or iron than where the greater part of the air is removed before the feed water is passed through the tank containing the steel or iron. By using the two methods of elimination of oxygen through subjecting the water to a reduced pressure by passing the feed water over pieces of steel or iron, advantages are secured that cannot be obtained by using either method alone.

The method of operation of my invention will be understood by reference to the following description and the accompanying diagrammatic drawing.

Referring to this drawing, the numeral 1 designates a boiler, and 2 the steam and water drum thereof. In the outlet flue 3 is located an economizer, indicated, in general, by the reference character A, and consisting, as shown, of a series of tubes 4 connected to horizontal boxes 5. A fan 6 provides the necessary draft suction through the economizer and delivers the waste gases to the uptake 7. The water, after being treated, as hereinbefore described, is fed to the economizer through an inlet pipe 8, and is delivered to the steam and water drum 2 through pipe 9, or it may be fed directly to the boiler through the valved connection 27 in case the economizer is not to be used.

The feed water is pumped from an inlet pipe 11 by a pump 10, which is driven by the steam engine 12, through pipe 13 to a closed tank 14 having a blow-off connection 14', and in which the water is maintained at a substantially constant level by a float 15 controlling a valve in the outlet pipe 16. The valve in the outlet pipe makes it possible to carry a lower pressure in the tank 20 than in the heating tank 14. In the tank 14 the water is heated to any desired temperature, preferably to at least 140° to 150° F. Such heating may be effected in any suitable manner, as by utilizing the steam entering through pipe 17 from the auxiliaries of the plant, as shown, the heating being facilitated by causing the water to flow over and through a series of perforated trays 18. The tank 14 is provided with a relief valve 19, which serves to relieve any excess of pressure in the tank 14. In case of the accumulation of an excessive amount of air and gases in the tank 14, the valve 19 will also open and relieve the air and gases.

The water thus heated is delivered through pipe 16 to a closed tank 20, the incoming water being discharged from the pipe either under the surface of the water in the tank or, as shown, admitted at the top of the tank and caused to flow over and through a series of perforated plates 21. The tank 20 is provided with a suitable blow-off connection 22 which, along with the blow-off connection 14' of the tank 14, is used for blowing off any deposit which may settle from the water. The heating of the water in the case of certain contained elements assists materially in the thoroughness with which the foreign matter will settle from the water and the blow-off valves in certain instances are therefore essential to the process. From the tank 20 the water flows through pipe 23 and preferably, through a filter 24 to the tank 25 which contains oxidizable material such as steel or iron pieces over which the feed water is made to flow, the pieces being preferably of such a shape that they present large surfaces with which the water comes in contact, and provide enough space between the pieces so that the oxidation will not interfere with the flow of the water through the tank. In flowing over the surfaces of the steel or iron pieces in the tank 25 any small amount of oxygen which may remain in the feed water is further reduced through the oxidation of the steel or iron pieces. The feed pump 26 draws the water from the tank 25 and forces it through the pipe 8 either through the valved connection 8' into the economizer A and then to the boiler, or through the valved connection 27 into the steam and water drum 2 of the boiler. In case the water is fed through the valved connection 27 directly into the boiler, the feed water is shut off from the economizer A, and the gases are passed directly to the stack through a flue 28, the damper 29 therein being open for the purpose, and the damper 30' in the flue leading to the economizer being closed. The tank 25 may be cut out for cleaning and for replacing the iron pieces by closing a valve 31 in the pipe 23 and passing the feed water through a valved pipe 30 connected to the pipe 23 between the tank 20 and the valve 31, and directly from the tank 20 to the suction side of the feed pump 26, a valve 31 in the pipe 30 between the pipe 23 and the pump 26 being open and a valve 32 in the pipe 30 located between the tank 25 and the pump 26 being closed. The apparatus may be so designed that enough of the air is removed by subjecting the water to a reduced pressure to make the use of the tank 25 containing the iron pieces unnecessary, and in such case the feed water would flow directly from the tank 20 to the feed pump 26 in the same way that it does when the tank 25 is cut out for cleaning. In the tank 20 the heated water may be subjected to a thorough boiling under a pressure, which may vary from zero to atmospheric or above, corresponding to the temperature of the water, to effect the removal from the water of the contained air and gases. To effect the boiling, a partial vacuum may be maintained by connecting tank 20, through pipes 33 and 34, with the condensing system of the main power plant, the vapor generated by the boiling being condensed in the condenser of the main power plant and the air removed from the water being taken out through a dry vacuum pump attached to the condenser. By operating in this manner, a separate means for creating a partial vacuum in tank 20 will not be required. The pipe 34 is provided with a throttling valve 35, the activity of the boiling of the water being governed by the amount said valve is opened—that is, the greater the valve is opened the greater will be the degree of vacuum. When operated in this way, the apparatus, after the proper amount of valve opening has been determined, will be, in a great measure, self-adjusting with respect to securing the proper amount and condition of boiling in the tank for different temperatures of feed water, the degree of partial vacuum maintained for a lower temperature being somewhat higher than for a higher temperature of the feed water with a given setting of the throttling valve 35. If desired, a pressure regulating valve 351 may be employed for maintaining a given amount of partial vacuum in the pipe 33 and in the tank 20. In case it is desired to use a means for creating a partial vacuum in the tank 20, independent of the condensing system of the main power plant, the vapor which passes from the tank 20 through the pipe 33 may be made to enter the condenser by closing the valve 35 and opening the valve 37. The air and gases would pass from the condenser 36 through the pipe 381 to the dry vacuum pump 39. The circulating water for the condenser 36 is the water which is pumped by the centrifugal pump 10 and supplied to the tank 14, this water being by-passed through the condenser 36 by opening the valves 40 and 41 and closing the valve 42. The water from the steam condensed in the condenser 36 is drawn through the pipe connection 43 by means of an independent pump, or, if the condenser 36 is set at a sufficient height above the tank 20 it may be returned by gravity, to the tank 20. By employing the water which is fed to the tank 14, as circulating water in the condenser 36, the heat in the steam discharged from the tank 20 is returned to the system and not wasted.

Tank 20 is provided with a relief valve 38 which in case a partial vacuum is carried in the tank 20 serves merely as an emergency valve, acting in the case of irregularity in the operation of the plant to relieve any possible back pressure above the atmosphere which may exist in the tank, so that if the cycle is such that the temperature in tank 20 is above 212°, the valve 38 may be set to relieve the pressure at a somewhat greater pressure than atmospheric.

The tank 25, which contains oxidable material such as iron or steel serves a useful function in some cases in removing corrosive elements other than air or oxygen that may be contained in the feed water.

As an alternative arrangement, the water may be heated in the low pressure stage of a two-stage economizer, such as illustrated in a Patent No. 1,219,320 which was issued to me March 13, 1917, as the water can be heated with no decrease in the economizer efficiency such as is present when the water is heated to an equivalent temperature by steam obtained from the auxiliaries of the plant. The cast iron or low pressure stage of the economizer can be operated successfully without undue corrosion with an entering feed temperature as low as is ordinarily obtained from the hot well, or with the hot well temperature elevated slightly through the return of the steam from some of the auxiliaries. To obtain the full economizer effect in increasing the efficiency, the colder the feed water is fed to the economizer the better. The two-stage economizer, therefore, makes it possible to operate with water entering the economizer at a minimum temperature, and at the same time, by heating the water to well above 140° to 150° F. before it enters the tank in which the air is removed, and the operation of boiling under a partial vacuum serves to remove the air or other gases before the water enters the wrought steel economizer. Whatever the type of economizer employed, fresh surfaces of the feed water should be exposed to the action of the partial vacuum—as, boiling at the surface of a large mass of water by reason of the vacuum is not sufficient for a complete removal of the air and gases. By constantly renewing the surface of the mass of water due to the agitation of the mass, full opportunity is afforded for the expulsion and removal of the air or other gases contained in the water.

With reference to the use of a partial vacuum, it will be obvious that if tank 20 is connected to the dry vacuum pump of the condenser system of the plant, the water must be heated to a temperature above that corresponding to the degree of vacuum employed in order that the boiling in tank 20 may be effected without the further application of heat to the water.

What I claim and desire to secure by Letters Patent of the United States is:—

1. The method of degassing water which consists in boiling the water under a partial vacuum to expel the greater part of the contained air or other gases and then passing the water over an oxidizable material.

2. The method of degassing water which consists in boiling the water under a partial vacuum to expel the greater part of the contained air or other gases and then passing the water over oxidizable iron.

3. The method of degassing water which consists in heating the water, and subjecting it to a sub-atmospheric pressure in a closed vessel to remove the greater portion of the air contained in the water and then passing the water over an oxidizable material.

4. The method of degassing water which consists in heating the water and boiling it in a closed vessel under a partial vacuum to remove the greater portion of the air contained in the water and then passing the water over an oxidizable material.

5. In an apparatus for degassing water, means for heating the water, a closed vessel, means for maintaining a partial vacuum in said vessel, means for spraying the heated water in said closed vessel and a tank containing oxidizable material and pipe connections to carry the water from said closed vessel to said tank and from the tank to the point of use.

6. In an apparatus for degassing water, means for heating the water, a closed vessel, means for maintaining a partial vacuum in said vessel, pipe connections to conduct the heated water to said vessel, a tank containing oxidizable material and pipe connections to carry the water from said closed vessel to said tank and from the tank to the point of use.

7. In an apparatus for degassing water, a heater for the water, the water in said heater being open to the atmosphere, a tank containing oxidizable material and pipe connections to conduct the water from the heater to the tank and from the tank to the point of use.

8. In an apparatus for degassing water, means for heating the water, a closed vessel in which the heated water is subjected to sub-atmospheric pressure, means for maintaining a vacuum in said vessel sufficient to cause the water to boil at the temperature of the water in said vessel and means to cause the degree of vacuum in said vessel to increase or decrease as the temperature of the water in said vessel decreases or increases, whereby the boiling of the water will be approximately constant with varying temperatures of the water and an outlet pipe from the closed vessel, said pipe connecting with the vessel below the water line thereof.

9. In an apparatus for treating boiler water in a system including an exhaust steam condenser, means for heating the feed water, a closed vessel in which the heated water is subjected to sub-atmospheric pressure and pipe connections between said vessel and the condenser, and a throttling valve in said connections and an outlet pipe from the closed vessel, said pipe connecting with the vessel below the water line thereof.

10. In an apparatus for treating boiler water in a system including an exhaust steam condenser, means for heating the feed water, a closed vessel in which the heated water is subjected to sub-atmospheric pressure and pipe connections between said vessel and the condenser, and a regulating valve in said connections.

11. In an apparatus for treating boiler water in a system including an exhaust steam condenser, means for heating the feed water, a closed vessel in which the heated water is subjected to sub-atmospheric pressure and pipe connections between said vessel and the condenser, and a throttling valve and a regulating valve in said connections.

12. In an apparatus for treating boiler water in a system including an exhaust steam condenser, means for heating the feed water, a closed vessel, means for agitating the heated water in said vessel, and pipe connections between said vessel and the condenser.

13. In an apparatus for degassing water, a first tank, means for heating the water therein, a second tank, pipe connections between the first and second tanks and means for maintaining a vacuum in said second tank and blow-off connections in each of said tanks.

14. In an apparatus for degassing water, a first tank, means for heating the water therein, a second tank, pipe connections between the first and second tanks and means for maintaining a vacuum in said second tank, and a blow-off connection in said first tank.

15. The method of degassing water which consists in heating the water in a vessel vented to the atmosphere to remove a portion of the air contained in the water and then passing the water over an oxidizable material.

16. The method of degassing water which consists in heating the water in a vessel vented to the atmosphere to remove a portion of the air contained in the water, then subjecting the water to a sub-atmosphere in a closed vessel and then passing the water over an oxidizable material.

17. The method of degassing water which consists in heating the water in a vessel vented to the atmosphere to remove a portion of the air contained in the water, then boiling the water in a closed vessel under a partial vacuum and then passing the water over an oxidizable material.

18. In an apparatus for degassing water, a vessel vented to the atmosphere and means for heating the water therein to remove a portion of the air contained in the water, a closed vessel, means for maintaining a partial vacuum in said closed vessel, pipe connections to conduct the heated water from said open vessel to said closed vessel, a tank containing oxidizable material and pipe connections to carry the water from said closed vessel to said tank and from the tank to the point of use.

19. Apparatus for degassing water, comprising a first vessel vented to the atmosphere, means for heating water by steam in said first vessel, a second vessel connected to the first vessel and in which the water is subjected to sub-atmospheric pressure to boil it, whereby air and gases are carried off with the vapor produced by the boiling, a condenser to condense such vapor, piping arranged to conduct the water passing to the first vessel through the condenser to receive the heat of such vapor, a tank containing oxidizable material, and piping to conduct the water from said second tank through the oxidizable material before such water passes to the point of use.

20. The combination of an apparatus for degassing water, comprising a vessel for containing heated water, means to agitate the water to partially liberate the gases contained therein, an outlet for the escape of the liberated gases, a second vessel containing deoxidizing material into which the partially degassed water flows from the first vessel, and an outlet from said second vessel for the completely degassed water.

21. An apparatus for degassing water, comprising a vessel for receiving heated water, means for agitating and means subjecting the heated water to vacuum to partially liberate the gases contained therein, a second vessel containing deoxidizable material into which the partially degassed water flows from the first vessel, and an outlet from said second vessel for the completely degassed water.

DAVID S. JACOBUS.